United States Patent Office

HENRY SCHEFFER, OF ST. LOUIS, MISSOURI.

Letters Patent No. 64,256, dated April 30, 1867.

---

IMPROVED PROCESS FOR PRESERVING EGGS.

---

The Schedule referred to in these Letters Patent and making part of the same.

---

TO ALL WHOM IT MAY CONCERN:

Be it known that I, HENRY SCHEFFER, of the city and county of St. Louis, and State of Missouri, have invented a new and useful Process of Preserving Eggs; and I do hereby declare the following to be a full and true account thereof.

The decay of eggs within their shells is due to oxidizing influences of the atmospheric air (or the oxygen hereof) exerted through the pores of the egg-shell. To prevent the disorganization or rot of the animal organic matter within the egg-shell, and forming yellow or yolk and white thereof, the nature of my invention is, firstly, in the formation of an air-excluding coating immediately under or within the egg-shell. Said nature of my invention is, secondly, in forming an air-tight coating upon and immediately without the egg-shell; and lastly, in forming said air-tight coating both immediately inside and immediately outside the egg-shell.

To enable those skilled in these arts to make and use my new process, I will now give a detailed description thereof.

Firstly, to form an air-tight coating within and immediately under the egg-shell, I use a heated solution of alum and common salt. Said solution may be formed by dissolving three parts of alum and one part of salt in about sixteen parts of water, although the said proportions, which are by weight, may be largely varied without detriment to the result. Said solution should be heated not over two hundred and twelve (212°) degrees Fahrenheit, and the fresh eggs simply dipped therein. It may be advantageous to retain the eggs in the solution for a minute, more or less. I do now specially declare that the effective agent to form an air-tight stratum under the egg-shell in this process is the "alum;" the action of the parts used as before described being supposititiously in manner following: By endosmosis the salt aids the heated solution to pass the pores of the egg-shell. Now, it is plain that this beneficial action of salt creates no necessity for the use thereof, but that the process is simply expedited by the addition of salt to an alum solution. The alum being introduced within and under the egg-shell produces a coagulation of the egg-white, and this coagulum in thin stratum forms the air-excluding membrane necessitated in the nature of my invention. I now place the eggs so prepared in a solution of silicate of soda or potash, such as is mercantile. Said solution may be formed by calcining (15) fifteen parts, by weight, of soda or potash with (25) twenty-five parts, by weight, of quartz or sand, the product then being dissolved in an arbitrary quantum of water, (say three parts of water to one of silicate.) By the combined action of said solutions of alum and silicate aforesaid a silicious coating is formed without the egg-shell, in addition to said impervious coating within the shell, thus enabling the eggs so prepared to resist the oxidizing influences, as well as strengthening the shell thereof materially, and thus creating less liability of breakage in transportation.

Having thus fully described my said invention, what I claim, is—

The process of forming a silicious coating by the application of a silicate and any simple or double alkaline salt, acting substantially as described in process numbered three.

In witness whereof I have hereunto set my hand this first day of October, 1866, in presence of—

H. SCHEFFER.

Witnesses:
GEO. P. HERTHEL, Jr..
CHAS. H. BOYLE.